(12) United States Patent
Cox et al.

(10) Patent No.: US 10,060,557 B2
(45) Date of Patent: Aug. 28, 2018

(54) CABLE PASS THROUGH SEALING SYSTEMS

(71) Applicant: Superior Tray Systems Inc., Surrey (CA)

(72) Inventors: Martin Cox, Surrey (CA); Sydney Jung, Surrey (CA)

(73) Assignee: SUPERIOR TRAY SYSTEMS INC., Surrey (CA)

( * ) Notice: Subject to any disclaimer, the term of this patent is extended or adjusted under 35 U.S.C. 154(b) by 0 days.

(21) Appl. No.: 15/787,222

(22) Filed: Oct. 18, 2017

(65) Prior Publication Data

US 2018/0038519 A1 Feb. 8, 2018

Related U.S. Application Data

(62) Division of application No. 14/247,119, filed on Apr. 7, 2014.

(30) Foreign Application Priority Data

Mar. 26, 2014 (CA) ...................................... 2847606

(51) Int. Cl.
*F16L 3/22* (2006.01)
*F16L 5/10* (2006.01)
(Continued)

(52) U.S. Cl.
CPC .................. *F16L 5/10* (2013.01); *F16L 5/14* (2013.01); *H02G 3/22* (2013.01)

(58) Field of Classification Search
CPC .......... H02G 3/32; H02G 3/30; H02G 3/0608; H02G 3/26; H02G 3/0456; H02G 3/263;
(Continued)

(56) References Cited

U.S. PATENT DOCUMENTS

| | | |
|---|---|---|
| 2,355,742 A | 9/1942 | Morehouse |
| 2,404,531 A | 12/1943 | Robertson |

(Continued)

FOREIGN PATENT DOCUMENTS

CA 2691901 A1 9/2010

OTHER PUBLICATIONS

Primus Tower Division Catalog, 2nd Edition, 2012, pp. 13-14.
(Continued)

*Primary Examiner* — Steven M Marsh
(74) *Attorney, Agent, or Firm* — Norton Rose Fulbright Canada LLP

(57) ABSTRACT

An apparatus for providing a seal around a plurality of elongated members passing through an aperture in a barrier comprises a plurality of support blocks for mounting to the barrier and extending across the aperture, each support block comprising a block body having a back side facing toward the barrier and having at least one interfacial side facing toward an interfacial side of another support block. Each interfacial side comprises a plurality of bearing surfaces and a plurality of passage portions between the bearing surfaces, each bearing surface configured to bear against a corresponding bearing surface on the interfacial surface of the other support block. A sealant portion covers a substantial area of each bearing surface, each of the sealant portions constructed from a compressible sealing material. One or more passage strips constructed from the compressible sealing material extend across each passage portion between two bearing surfaces on either side of the passage portion. A wall seal band on the back side of each block body, constructed from the compressible sealing material, extends from the bearing surface on one lateral side of the block body, around all of the plurality of passage portions, to the bearing surface on the other lateral side of the block body.

20 Claims, 7 Drawing Sheets

(51) Int. Cl.
*H02G 3/22* (2006.01)
*F16L 5/14* (2006.01)

(58) Field of Classification Search
CPC ...... H02G 3/22; H02G 3/0418; H02G 3/0437; H02G 3/4443; H02G 3/0487; H02G 3/0431; H02G 11/00; H02G 11/045; F16L 3/24; F16L 3/223; F16L 3/237; F16L 3/2235; F16L 3/22; F16L 3/13; F16L 3/222; F16L 3/04; F16L 3/221; F16L 3/233; F16L 3/23; F16L 3/1075; F16L 3/227; F16L 3/137
USPC ............................. 248/49, 65, 68.1, 73, 74.1
See application file for complete search history.

(56) References Cited

U.S. PATENT DOCUMENTS

| | | | |
|---|---|---|---|
| 3,531,071 A | 8/1968 | Kubli | |
| 4,889,298 A * | 12/1989 | Hauff | F16L 5/08 174/503 |
| 5,261,633 A | 11/1993 | Mastro | |
| 5,689,862 A | 11/1997 | Hayes et al. | |
| 5,742,982 A | 4/1998 | Dodd et al. | |
| 5,794,897 A | 8/1998 | Jobin et al. | |
| 5,992,802 A | 11/1999 | Campbell | |
| 6,107,571 A * | 8/2000 | Damm | H02G 15/113 174/72 C |
| 6,135,398 A | 10/2000 | Quesnel | |
| 6,561,466 B1 | 5/2003 | Myers et al. | |
| 6,902,138 B2 | 6/2005 | Vantouroux | |
| 7,007,900 B2 * | 3/2006 | Goodwin | H02G 7/053 248/68.1 |
| 7,175,138 B2 * | 2/2007 | Low | H02G 3/263 24/455 |
| 7,278,190 B2 * | 10/2007 | Fischer | F16L 3/13 24/530 |
| 8,074,945 B2 | 12/2011 | Schoenau et al. | |
| 8,294,030 B2 | 10/2012 | Pollard, Jr. | |
| 9,297,479 B2 * | 3/2016 | Kato | F16L 3/2235 |
| 2008/0203245 A1 * | 8/2008 | Clark | F16L 3/1033 248/68.1 |
| 2008/0251651 A1 | 10/2008 | Jackson et al. | |
| 2009/0224111 A1 | 9/2009 | Gilbreath | |
| 2010/0123048 A1 | 5/2010 | Pollard, Jr. | |
| 2011/0126934 A1 | 6/2011 | Thuesen | |
| 2011/0253846 A1 * | 10/2011 | Kataoka | B61D 49/00 248/68.1 |
| 2012/0205500 A1 | 8/2012 | Cox | |
| 2014/0091182 A1 * | 4/2014 | Fukumoto | F16L 3/2235 248/68.1 |

OTHER PUBLICATIONS

U.S. Office Action dated Apr. 3, 2015, issued against related U.S. Appl. No. 13/782,978.
U.S. Office Action dated Jan. 6, 2016, issued against related U.S. Appl. No. 13/782,978.
U.S. Office Action dated Sep. 22, 2016, issued against related U.S. Appl. No. 14/247,119.
U.S. Office Action dated May 18, 2017, issued against related U.S. Appl. No. 14/247,119.

* cited by examiner

CABLE PASS THROUGH SEALING SYSTEMS

CROSS-REFERENCE TO RELATED APPLICATIONS

This application is a divisional of U.S. patent application Ser. No. 14/247,119 filed on Apr. 7, 2014, which in turn claims the benefit of priority of Canadian Patent Application No. 2,847,606 filed on Mar. 26, 2014. Both U.S. patent application Ser. No. 14/247,119 and Canadian Patent Application No. 2,847,606 are hereby incorporated herein by reference in their entirety.

TECHNICAL FIELD

The present disclosure relates generally to apparatus and methods for allowing cables or other elongated members to pass through a wall or other barrier while providing environmental seals around the cables.

BACKGROUND

Electrical cables or other elongated members such as pipes, conduits or the like, often need to pass through walls or other barriers. In some situations, any openings through a wall must be sealed to prevent water or other materials from passing the barrier. This may be typically accomplished by, for example, a worker applying a settable sealant (such as, e.g. caulking or the like) around the cables at a worksite. The application of sealants at a worksite can be a time consuming and error prone operation, particularly where a large number of cables must be sealed.

The inventor has determined a need for improved apparatus and methods for sealing cables or other elongated members as they pass through a wall or other barrier.

SUMMARY

The disclosure generally relates to apparatus and methods for providing environmental seals around cables or other elongated members as they pass through a wall or other barrier. Support blocks are provided with a plurality of pre-formed areas of compressible sealing material that cooperate to form seals when installed around members passing through an aperture in a seal plate or other barrier material.

According to one aspect, an apparatus for providing a seal around a plurality of elongated members passing through an aperture in a barrier comprises a plurality of support blocks for mounting to the barrier and extending across the aperture, each support block comprising a block body having a back side facing toward the barrier and having at least one interfacial side facing toward an interfacial side of another support block. Each interfacial side comprises a plurality of bearing surfaces and a plurality of passage portions between the bearing surfaces, each bearing surface configured to bear against a corresponding bearing surface on the interfacial surface of the other support block. A sealant portion covers a substantial area of each bearing surface, each of the sealant portions constructed from a compressible sealing material. One or more passage strips constructed from the compressible sealing material extend across each passage portion between two bearing surfaces on either side of the passage portion. A wall seal band on the back side of each block body, constructed from the compressible sealing material, extends from the bearing surface on one lateral side of the block body, around all of the plurality of passage portions, to the bearing surface on the other lateral side of the block body.

Further aspects and details of example embodiments are set forth below.

BRIEF DESCRIPTION OF THE DRAWINGS

Embodiments of the present invention will now be described, by way of example, with reference to the attached Figures, in which.

DETAILED DESCRIPTION

Figure 1:
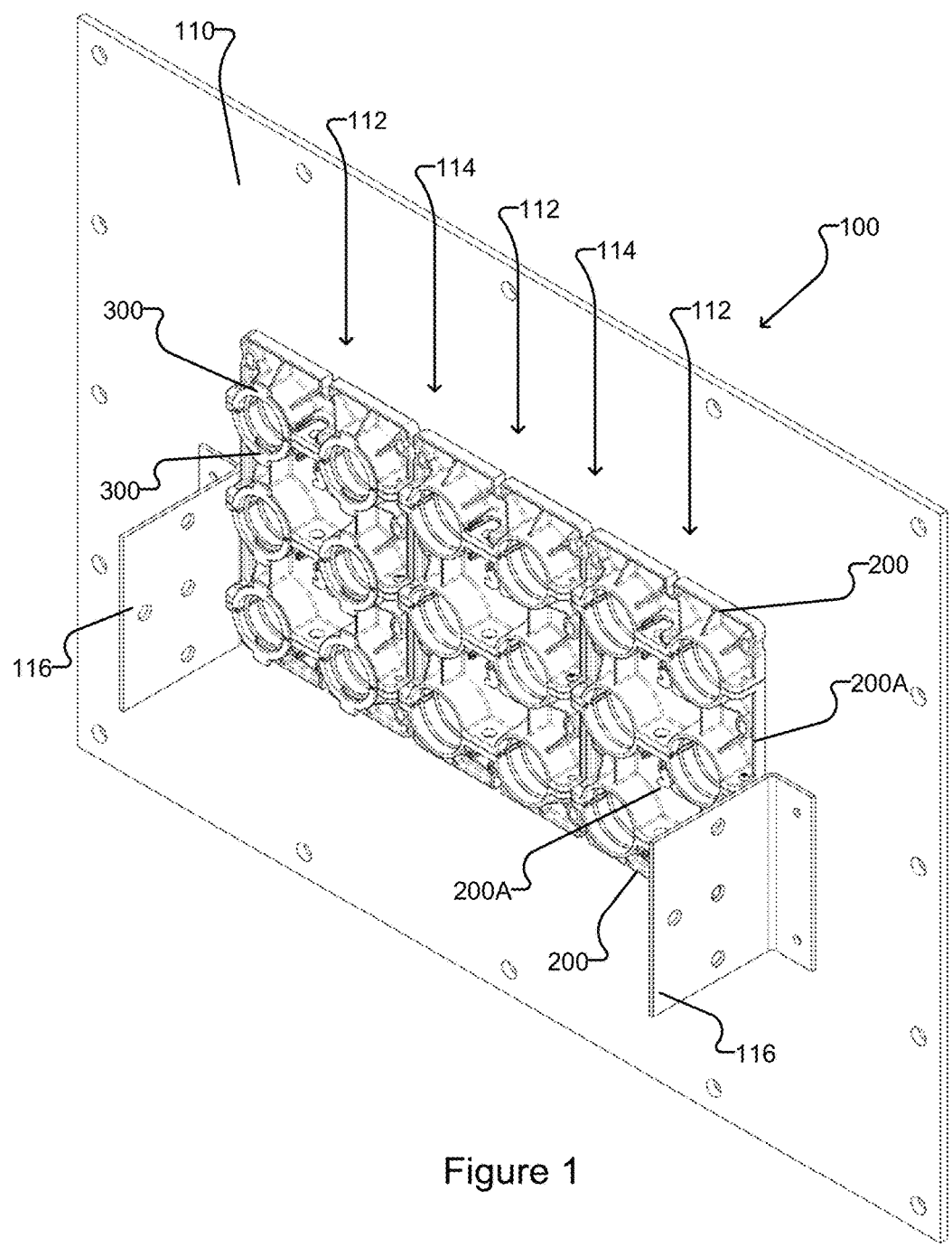
FIG. 1 shows a sealing system according to an example embodiment.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an apparatus for providing environmental seals around cables or other elongated members as they pass through a wall or other barrier. Support blocks are provided with a plurality of pre-formed areas of compressible sealing material that cooperate to form seals when installed around members passing through an aperture, as described in detail below. In some embodiments, each adjacent pair of blocks form a plurality of passages along their interface for securely receiving cables. In other embodiments, inserts are provided in the passages for securely receiving cables of different sizes and/or shapes. The blocks may have sealing material along a substantial portion or all of the interfacial surfaces, may have strips of sealing material along a rear side of each block that abuts a seal plate in the wall, and may have strips of sealing material across the body portions forming the passages. The inserts may have strips of sealing material on their outer surfaces for bearing against the strips of sealing material across the body portions of the blocks forming the passages, and may have strips of sealing material on their inner surfaces for bearing against cables of other elongated members. The blocks and inserts may also have various features described in U.S. patent application Ser. No. 13/782,978, which is hereby incorporated by reference herein.

FIG. 1 shows an example sealing system 100 according to one embodiment. The system 100 is configured to sealingly engage a plurality of cables and allow the cables to pass through a wall or other barrier. In the illustrated example, a seal plate 110 is provided to be secured over an opening through the barrier. The seal plate 110 has a plurality of apertures 112 therethrough. As discussed below, each of the apertures 112 is associated with a plurality of cables (which may be referred to as a "course" of cables), and a plurality of support blocks 200 are mounted across each aperture 112 for supporting the course of cables. Alternatively, in some embodiments apertures may be formed directly in the material of a wall or other barrier. Brackets 116 may be provided for mounting a cable tray or the like to the seal plate 110.

Figure 5:
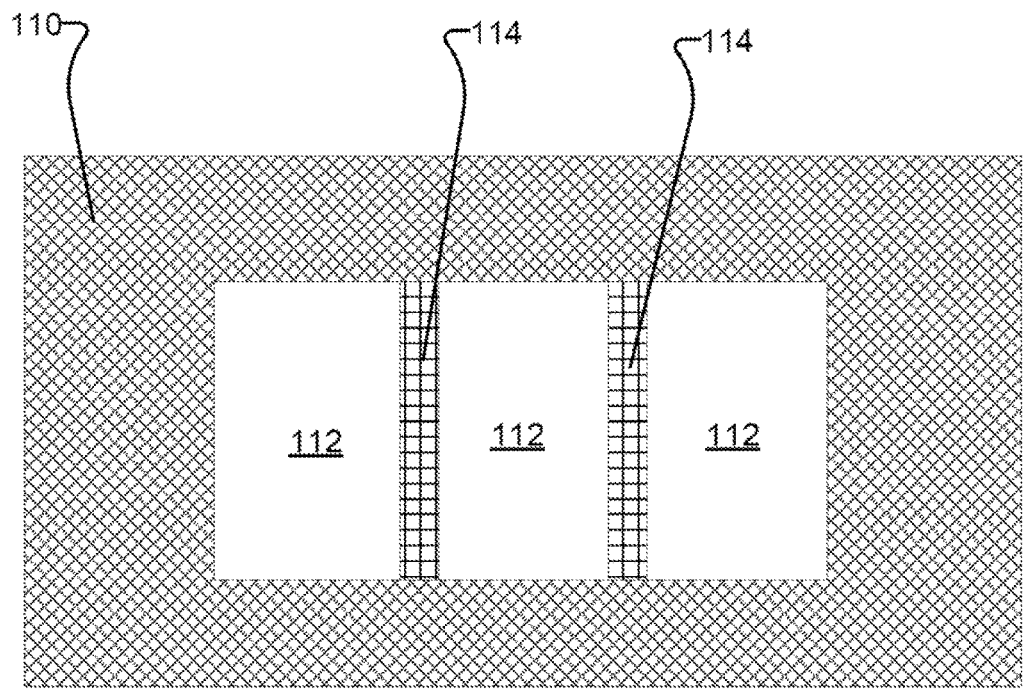
FIG. 5 schematically depicts an example seal plate of the system of FIG. 1 in isolation.
Figure 5A:
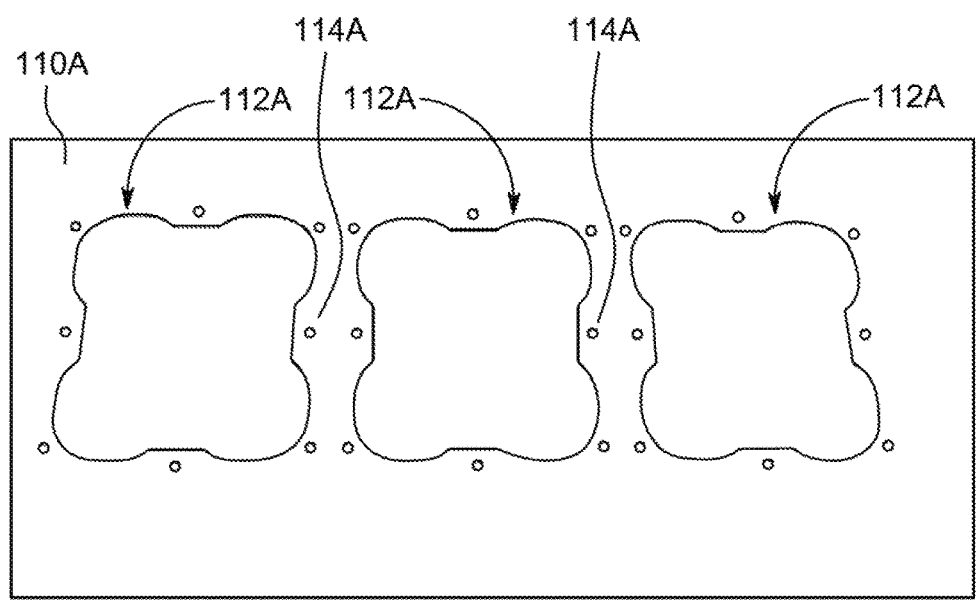
FIG. 5A shows an example seal plate according to another embodiment.

As best seen in FIG. 5, the apertures 112 are separated by bands 114 of material for mounting the blocks 200. In some embodiments the bands 114 are formed from the material of the seal plate 110 or the barrier itself. For example, FIG. 5A shows three apertures 112A cut out from a seal plate 110A, leaving bands 114A. Alternatively, the bands 114 could be separate elements secured across an opening in the seal plate or barrier at spaced apart locations to accommodate the mounting of the blocks 200.

Figure 2:
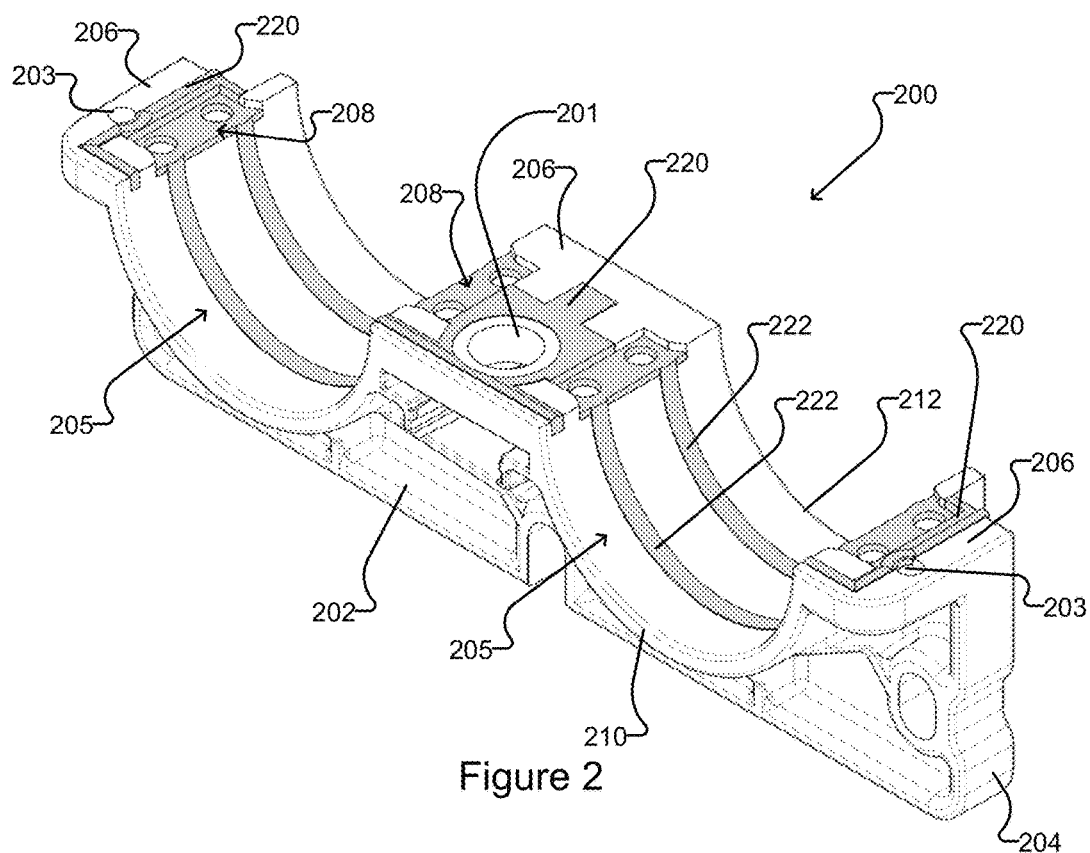
FIG. 2 shows an example support block of the system of FIG. 1 in isolation.
Figure 2A:
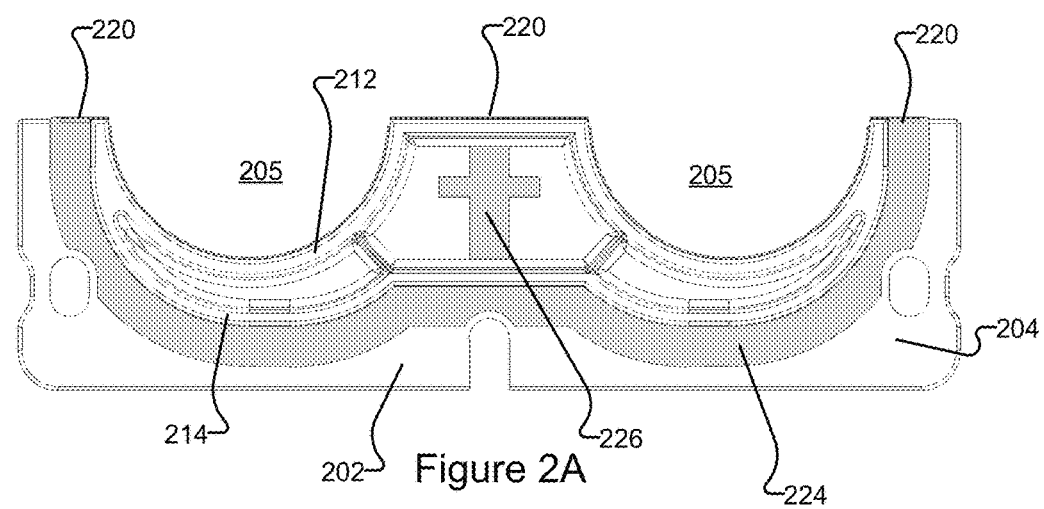
FIG. 2A is a rear view of the block of FIG. 2.
Figure 4:
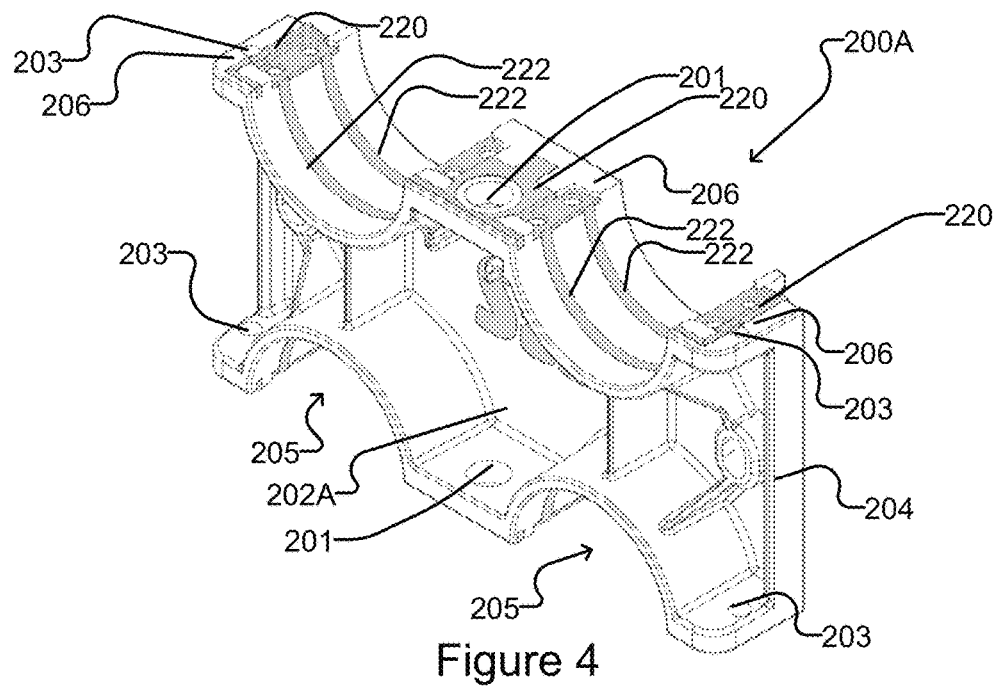
FIG. 4 shows an example middle support block of the system of FIG. 1 in isolation.

Returning to FIG. 1, in the illustrated example, two support blocks 200, which may be referred to as "end" support blocks, and two support blocks 200A, which may be referred to as "middle" support blocks are mounted to extend across each aperture 112. An example end support block 200 is shown in FIGS. 2-2C, and an example middle support block 200A is shown in FIGS. 4 and 4A, which are discussed further below.

Figure 4A:
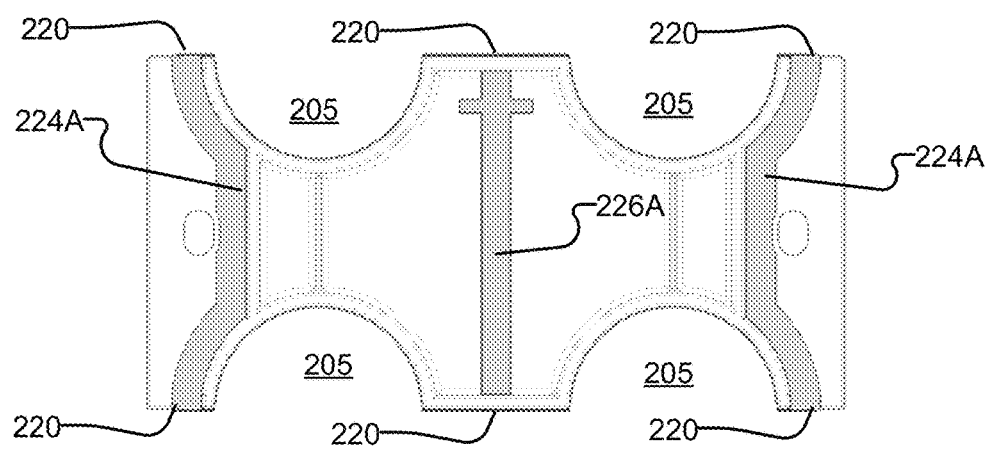
FIG. 4A is a rear view of the block of FIG. 4.

In the illustrated examples, each end support block 200 has two passage portions 205 thereon (see FIG. 2A) and each middle support block 200A has four passage portions 205 thereon (two on each side, see FIG. 4A). However, it is to be understood that each end support block 200 can have more than two passage portions 205, and each middle support block 200A can have more than four passage portions 205, in other embodiments. In some embodiments, such as the illustrated example, the passage portions 205 are all generally semi-circular in cross-section. However, it is to be understood that the passage portions may have different shapes in other embodiments, for example for supporting different types of elongated members. In certain preferred embodiments, the passage portions are all the same shape, such that the end support blocks 200 at the top and bottom can be substantially identical.

Figure 3:
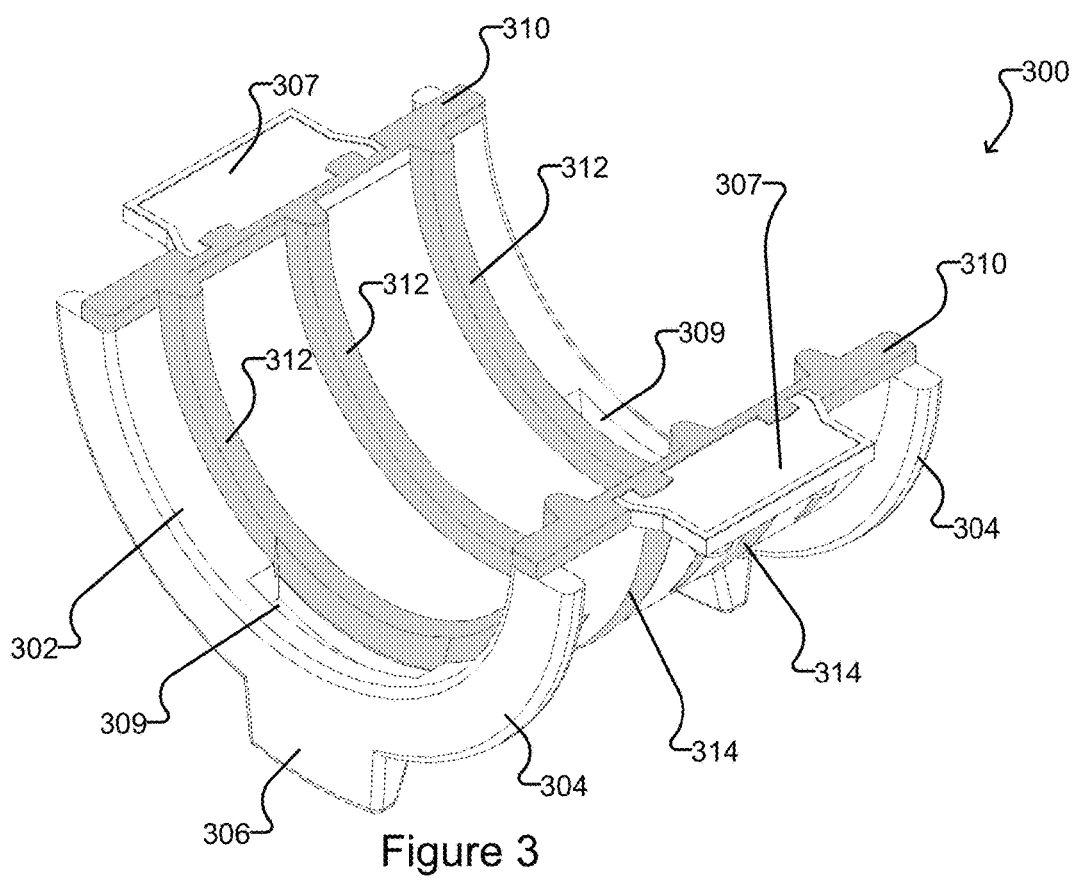
FIG. 3 shows an example insert of the system of FIG. 1 in isolation.
Figure 3A:
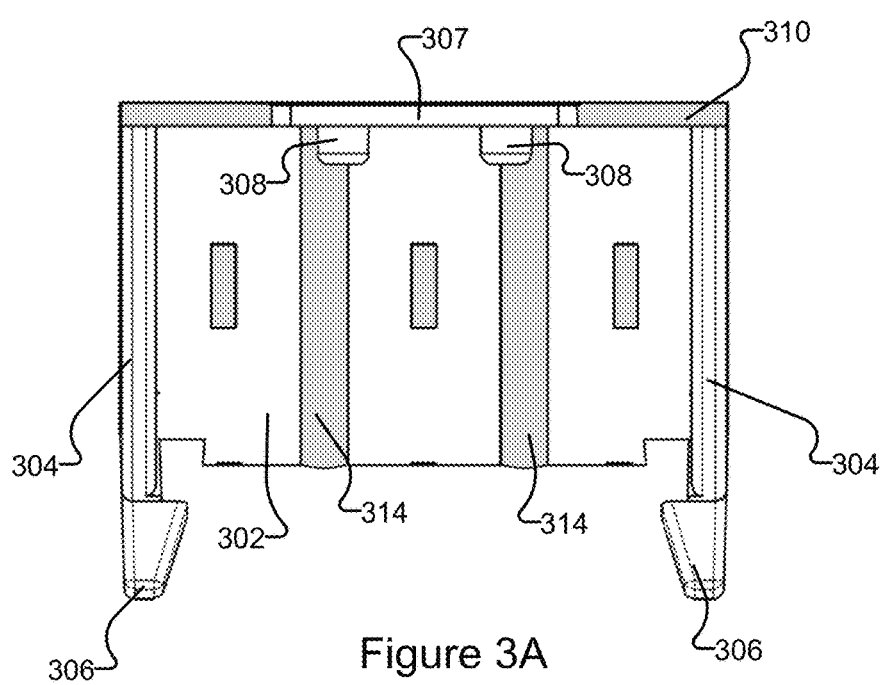
FIG. 3A is a side view of the insert of FIG. 3.

In the FIG. 1 example, each set of blocks 200 and 200A forms six passages for allowing a course of six cables or the like to pass through the associated aperture 112. A pair of inserts 300 may be provided in each passage, selected according to the size and shape of the cable to pass through that passage. An example insert 300 is shown in FIGS. 3 and 3A and discussed further below.

In the example illustrated in FIG. 1 the system 100 comprises three such sets of blocks 200 and 200A for accommodating 18 cables through three apertures 112, but it is to be understood that any number of cables could be accommodated by varying the number of blocks 200/200A and apertures 112. For example, a course of more than six cables could be accommodated by providing additional middle support blocks 200A, and fewer than six by providing fewer middle support blocks 200A. Two end support blocks 200 could be used to secure two cables through a single aperture. Also, the number of half passages in each block 200/200A could be varied.

FIGS. 2-2C show an example end support block 200 in isolation, and FIGS. 4-4A show an example middle support block 200A in isolation. Each block 200/200A comprises a block body 202/202A having a peripheral portion 204 with a number of bolt holes or the like for receiving fasteners for securing the block 200/200A to the seal plate 110 or other barrier. The body 202 of block 200 has a central bolt hole 201 or the like for receiving a fastener to secure the block 200 to another end support block 200 or a middle support block 200A. In certain embodiments, the body 202 of block 200 has two peripheral bolt holes 203 or the like for receiving a fastener to secure the block 200 to another end support block 200 or a middle support block 200A. Similarly, the body 202A of block 200A has central bolt holes 201 or the like on opposite sides thereof, and/or peripheral bolt holes 203 or the like on opposite sides thereof for receiving one or more fasteners to secure the block 200A to other blocks 200/200A.

The body 202 of block 200 has a plurality of bearing surfaces 206 along an interfacial side of the body 202 that are configured to bear against bearing surfaces 206 of another end support block 200 or a middle support block 200A. Similarly, the body 202A of block 200A has a plurality of bearing surfaces 206 along two opposing interfacial sides thereof configured to bear against bearing surfaces 206 of others blocks 200 or 200A. Each block body 202/202A also defines a plurality of passage portions 205 along each interfacial side between the bearing surfaces 206.

The block bodies 202 and 202A may be constructed from a relatively hard material. The bodies 202 and 202A may, for example, be constructed of a material with a hardness of about three times the hardness of the material used for constructing the inserts 300. For example, in some embodiments the material used for constructing the bodies 202 and 202A may have a hardness of about 120 the Rockwell scale and the material used for constructing the inserts 300 may have a hardness of about 60 on the Rockwell scale. Having an insert 300 with radial flexibility provides flexibility at the point of contact with the cables or other elements, resulting in decreased straining thereon. Meanwhile, the rigidity of the bodies 202 and 202A provides rigidity and strength to assist in supporting and limiting displacement of the cables. Each insert may be constructed from a material which is self-lubricating, and which has heat and UV resistant properties. The block bodies 202 and 202A may also be constructed from a heat- and UV-resistant material.

Relatively strong attractive or repulsive forces may develop between cables carrying large electrical currents. Such cables also generate heat, with temperatures of about 90° C. being typical during normal operation. Such forces and heat increase sharply in the event of a short circuit or other electrical problem. The blocks 200/200A and inserts 300 limit movement of the cables and prevent the cables from contacting each other in the vicinity of the seal system, and from contacting other supporting structures such as a cable tray or the like.

Figure 2B:
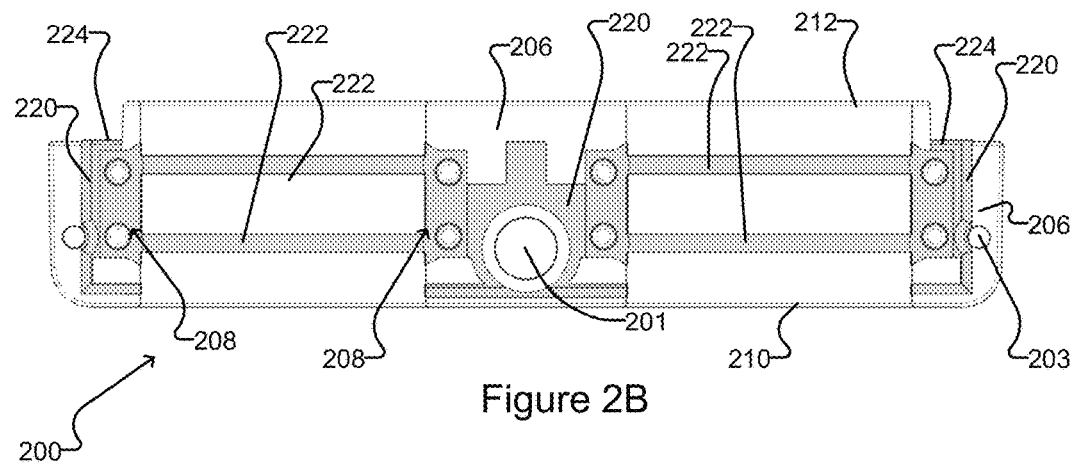
FIG. 2B is a top view of the block of FIG. 2.
Figure 2C:
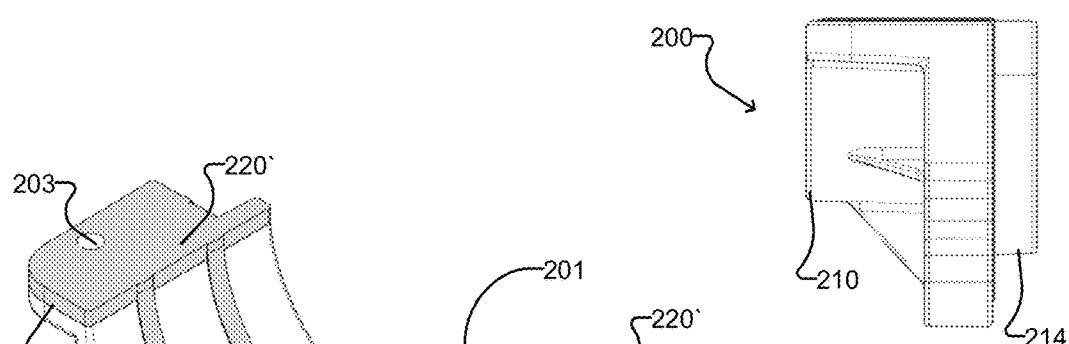
FIG. 2C is a side view of the block of FIG. 2.

As best seen in FIGS. 2 and 2B, in the illustrated example the block bodies 202 and 202A have recessed portions 208 on either side of each passage portion 205. The recessed portions 208 are shaped to receive a tab 307 and protrusions 308 on either side of an insert 300 (See FIGS. 3 and 3A), as described further below.

Each passage portion 205 has a front lip 210 and a back lip 212 on opposite ends thereof. The term "front" and related terms are used herein to refer to the direction away from the seal plate or barrier to which the blocks are attached, and the term "back" and related terms are used herein to refer to the direction toward the seal plate or barrier to which the blocks are attached. As best seen in FIG. 2A, an outer rib 214 may be provided extending from the back side of the block body 202. The outer rib 214 may have a shape corresponding with the shape of the aperture in the seal plate or barrier to assist with proper positioning of the blocks in the aperture. In the illustrated example, the outer rib 214 is shaped to correspond with the shape of aperture 112A of FIG. 5A.

Each bearing surface 206 has a sealant portion 220 constructed of a sealing material. The sealing material may, for example, comprise TPE or other such suitable material. In some embodiments, the sealing material has a compressibility of about Shore 20A. The sealant portions 220 may be formed by overmolding a pattern of sealing material on the block body 202/202A on each bearing surface 206.

Figure 2D:
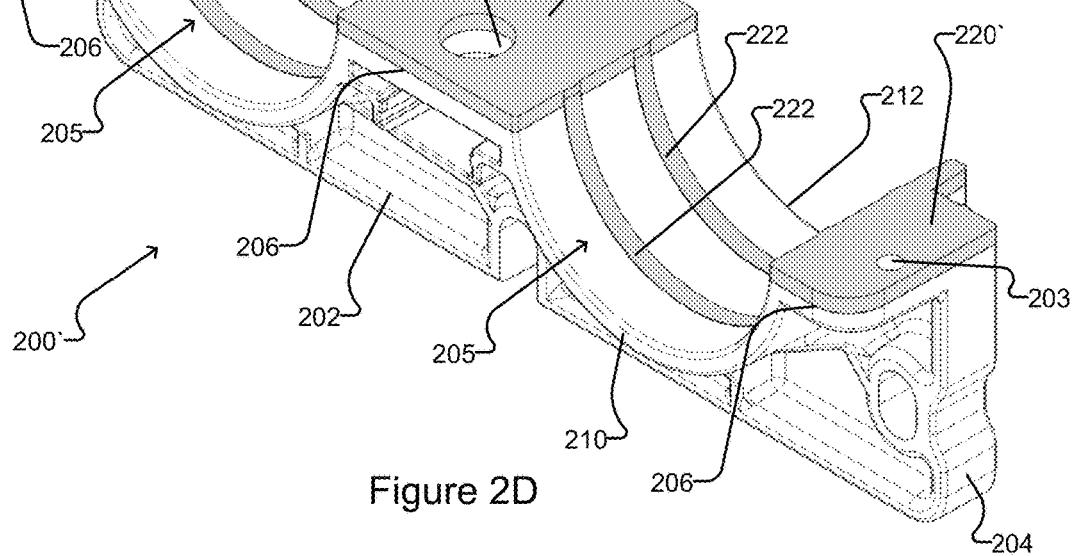
FIG. 2D shows another example embodiment of the support block of FIG. 2.
Figure 4B:
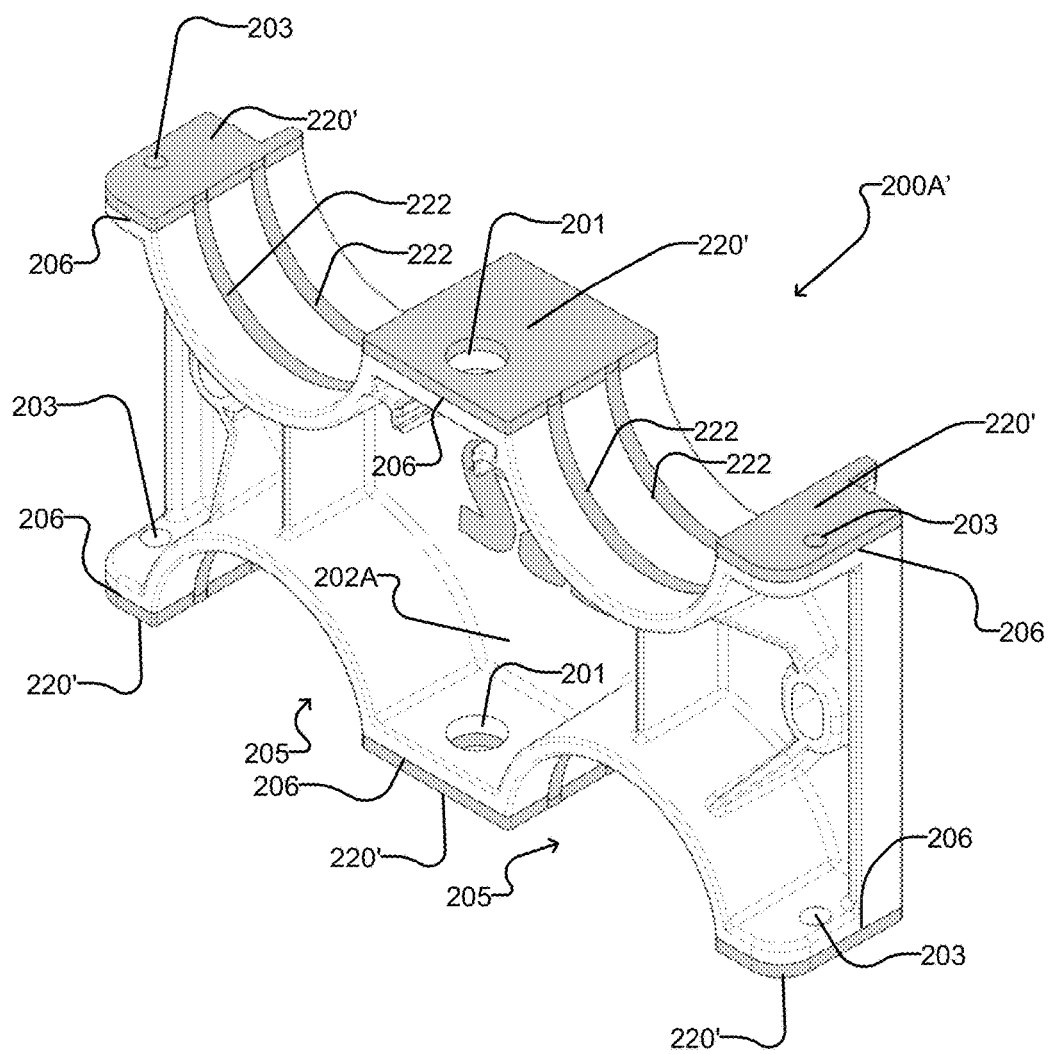
FIG. 4B shows another example embodiment of the middle support block of FIG. 4.

In some embodiments, the sealant portions 220 may extend across substantially all of each bearing surface 206, as shown in FIGS. 2D and 4B, which respectively illustrate other example embodiments of an end support block 200' and a middle support block 200A'. End support block 200' of FIG. 2D is substantially similar to block 200 of FIGS. 2-2C, other than the fact that sealant portions 220' cover substantially all of each bearing face 206. Likewise, middle support block 200A' of FIG. 4B is substantially similar to block 200A of FIGS. 4-4A, other than the fact that sealant portions 220' cover substantially all of each bearing face. Blocks 200' and 200A' of FIGS. 2D and 4B also differ from blocks 200 and 200A in that blocks 200' and 200A' do not have recessed portions on either side of each passage portion 205, and as such, where inserts 300 are used with blocks 200' and 200A', tabs 307 and protrusions 308 are omitted.

As best seen in FIGS. 2 and 4, one or more passage strips 222 constructed of sealing material are provided across each passage portion 205. In the illustrated example, two parallel passage strips 222 are provided across each passage portion 205. In some embodiments, the passage strips 222 extend between the recessed portions 208 on the bearing surfaces 206 on either side of each passage portion 205. In some embodiments, the passage strips 222 may be in contact with the sealant portions 220 on the bearing surfaces 206 on either side of each passage portion 205.

As best seen in FIG. 2A, the block body 202 has a wall seal band 224 extending along the back side thereof from the bearing surface 206 at one lateral side of the block 200, around all of the passage portions 205, to the bearing surface 206 at the other lateral side of the block 200. The wall seal band 224 may be in contact with the sealant portions 220 on the bearing surfaces 206. As best seen in FIG. 4A, the block body 202A has a wall seal band 224A extending along both lateral sides of the back side thereof from the bearing surface 206 at one interfacial side of the block 200A, to the bearing surface 206 at the other interfacial side of the block 200A.

The block bodies 202 and 202A may also have bands 226 and 226A, respectfully, on the back sides thereof. The bands 226 and 226A facilitate overmolding, for example by providing a channel for the sealing material between the wall seal band 224 and the sealant portion 220 on the central bearing surface 206 of block 200, or between the sealant portions 220 on the two central bearing surfaces of block 200A. The bands 226 and 226A may be omitted in some embodiments.

FIG. 3 shows an example insert 300 for insertion into a passage portion 205. Each pair of inserts 300 inserted into passage portions 205 which face each other cooperate to form a guide configured to securely receive a cable or the like of a predetermined size and shape. The inserts 300 advantageously allow the same blocks used to support different types of cables of other elongated members, by inserting differently sized inserts 300 into the passage portions 205. In the illustrated example, the insert 300 has an outer diameter sized to fit in a corresponding passage portion 205 and an inner diameter sized to fit around a particular cable having a circular cross-section. However, it is to be understood that inserts may also be provided to accommodate non-circular cables by varying the inner surfaces of the inserts to conform to the outer surfaces of the cables. In some embodiments, the passage portions 205 themselves may be sized and shaped to fit the cables or other members, and the inserts may be omitted. In such embodiments, the passage strips 222 sealingly engage the cables.

The insert 300 comprises an insert body 302. In the illustrated example, the insert body 203 has a flange 304 at either end, but such flanges may be omitted in some embodiments. Where present, the flanges 304 fit over the lips 210 and 212 of the passage portion 205, and a tab 306 is provided extending from each flange 304 to engage the edge of one of the lips 210 or 212. Tabs 307 extend laterally outwardly from the sides of the insert body 302 and are configured to be received in the recessed portions 208 on either side of each passage portion 205. Protrusions 308 extend from the tabs 307 to hold the tabs 307 in the recessed portions 208. As noted above tabs 307 and protrusions 308 may be omitted when the insert 300 is to be used with a block lacking recessed portions 208. A drainage channel 309 may be provided near each end of the insert body 302 to provide paths for liquid to drain.

A longitudinal seal strip 310 is provided along the each side of the inner wall of the insert body 302. A plurality of inner seal strips 312 extend across the inner circumference of the insert body 302 between the longitudinal seal strips 310. The inner seal strips 312 are all preferably located between the drainage channels 309, in embodiments where the drainage channels 309 are present. A plurality of outer seal strips 314 extend across the outer circumference of the insert body 302 between the longitudinal seal strips 310. The outer seal strips 314 are positioned at longitudinal locations along the insert body 302 selected to correspond to the longitudinal locations of the passage strips 222 in the passage portion 205 of the block body 202/202A. Each of the inner and outer seal strips 312 and 314 is preferably in contact with each longitudinal seal strip 310.

Seal strips 310, 312 and 314 are all constructed of a sealing material. The sealing material may, for example, comprise TPE or other such suitable material. In some embodiments, the sealing material has a compressibility of about Shore 20A. The seal strips 310, 312 and 314 may be formed by overmolding a pattern of sealing material on the insert body 302 in some embodiments.

The sealing system 100 advantageously may be installed relatively quickly and efficiently, without any requirement for settable sealants at the work site, and the blocks 200/200A and inserts 300 cooperate to provide an environmental seal around a plurality of cables or the like. When the system 100 is installed, the sealant portions 220 on the bearing surfaces of the blocks 200/200A prevent liquid from passing between the blocks 200/200A. The wall seal bands 224 prevent liquid from passing between the blocks 200/200A and the seal plate 110 or other barrier material. The passage strips 222 prevent liquid from passing between the blocks 200/200A and the cables or other members. When inserts are used, the passage strips 222 and outer seal strips 314 prevent liquid from passing between the blocks 200/200A and the inserts 300. The longitudinal and inner seal strips 310 and 312 prevent liquid from passing between the inserts 300 and the cables or other members. In some embodiments, on each block 200 or block 200A, all of the sealant portions 220, passage strips 222 and wall seal band 224 or bands 224A may be continuously formed sealing material. In some embodiments the seal strips 310, 312 and 314 on each insert 300 are all continuously formed.

The blocks and inserts may be injection molded. Injection molding allows for cost effective production of the blocks and inserts. Due to the use of the inserts, blocks having identical guide-receiving feature sizes may be produced for supporting cables of various sizes. This allows the same mold to be used for various projects. Additionally, the modular stacking of blocks to form the support apparatus means that the same mold can be used for making blocks for projects requiring larger support apertures. If necessary, blocks of various sizes, such as blocks having a greater number of guide-receiving features, may be injection molded. To allow easy removal of the molded pieces, the molds for the blocks and the inserts should be designed with suitable drafts. Accordingly, in some embodiments, the passage portions 205 are tapered outwardly from the middles thereof, such that the passages through the blocks are slightly narrower at their centres than at their ends.

Plastic materials of sufficient strength, as required, may be used. In one embodiment, the plastic used for the inserts is more flexible than the material used to make the inserts. Having a softer insert provides flexibility at the point of contact between the cables and the support apparatus, avoiding excessive straining of the cables. The harder material forming the blocks provides additional rigidity and strength for supporting the cables and limiting the displacement of the cables. In some embodiments, a glass-filled polymer having relatively high thermal and UV resistance is used for the block bodies 202 and 202A.

The blocks 200/200A may, for example, be secured to each other and to the seal plate 110 or other barrier material by suitably bolts and nuts. In other embodiments, other suitable fastening means may be used to attach the blocks together. For example, clamps or ties may be used. The order in which the blocks 200/200A are to be secured to each other and to the seal plate 110 or other barrier material will depend on accessibility. Preferably, the blocks are secured row by row, each row beginning by securing an end support block.

The present disclosure may be embodied in other specific forms without departing from its essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. An apparatus for providing a seal around a plurality of elongated members, the apparatus comprising:
    a barrier having an aperture defined therein, the aperture sized to permit the plurality of elongated members to pass therethrough;
    a plurality of support blocks for mounting to the barrier and extending across the aperture, each support block comprising a block body having a back side facing toward the barrier and having at least one interfacial side facing toward an interfacial side of another support block, wherein each interfacial side comprises a plurality of bearing surfaces and a plurality of passage portions between the bearing surfaces, each bearing surface configured to bear against a corresponding bearing surface on the interfacial surface of the other support block;
    a sealant portion covering a substantial area of each bearing surface, each of the sealant portions constructed from a compressible sealing material;
    one or more passage strips constructed from the compressible sealing material and extending across each passage portion between two bearing surfaces on either side of the passage portion; and,
    a wall seal band on the back side of each block body constructed from the compressible sealing material, the wall seal band extending from a bearing surface on one lateral side of the block body, around all of the plurality of passage portions, to a bearing surface on the other lateral side of the block body to form a seal between the back side of the block body and the barrier around the aperture.

2. An apparatus according to claim 1 comprising a seal plate acting as the barrier, wherein the seal plate is attachable to a wall to cover an opening in the wall, and the seal plate defines the aperture and has a plurality of mounting points around the aperture for mounting the support blocks.

3. An apparatus according to claim 1 comprising a plurality of inserts, each insert configured for insertion into one of the passage portions of one of the block bodies, and comprising an insert body with an outer surface shaped to conform to a shape of the passage portion and an inner surface shaped to conform to a shape of one of the elongated members.

4. An apparatus according to claim 3 wherein each insert comprises a pair of longitudinal seal strips on opposed lateral sides of the inner surface of the insert body, one or more inner seal strips extending laterally across the inner surface of the insert body, and one or more outer seal strips extending laterally across the outer surface of the insert body.

5. An apparatus according to claim 4 wherein the one or more outer seal strips on the insert body are located to bear against the one or more passage strips when the insert is inserted into the passage portion.

6. An apparatus according to claim 3 wherein the inserts have greater radial flexibility than the passage portions.

7. An apparatus according to claim 3 wherein the block bodies are constructed from a first material having a first rigidity and the insert bodies are constructed from a second material having a second rigidity less than the first rigidity.

8. An apparatus according to claim 7 wherein the first material comprises a glass-filled polymer, and the second material comprises a self-lubricating material.

9. An apparatus according to claim 7 wherein the first material is about 120 on the Rockwell scale and the second material is about 60 on the Rockwell scale.

10. An apparatus according to claim 3 wherein at least one of the inserts comprises a channel near each end of the insert body to provide a path for liquid to drain.

11. An apparatus according to claim 3 wherein the support blocks further comprise recessed portions on either side of each passage portion.

12. An apparatus according to claim 11 wherein the insert further comprises tabs extending laterally outwardly from the insert body for holding the insert in corresponding recess portions of the support block.

13. An apparatus according to claim 1 wherein the plurality of support blocks comprise two end support blocks and one or more middle support blocks, each end support block having a single interfacial side with bearing surfaces and passage portions thereon, and each middle support block having two opposed interfacial sides with the bearing surfaces and passage portions thereon.

14. An apparatus according to claim 1 wherein the compressible sealing material is artificial rubber.

15. An apparatus according to claim 1 wherein the compressible sealing material is thermoplastic elastomer (TPE).

16. An apparatus according to claim 1 wherein the compressible sealing material has a compressibility of about Shore 20A.

17. An apparatus according to claim 1 wherein each passage portion has a semicircular cross section.

18. An apparatus according to claim 1 wherein the support blocks further comprise a plurality of bolt holes, each bolt hole extending through the blocks to facilitate fastening of the blocks together.

19. An apparatus according to claim 1 wherein the support blocks further comprise a plurality of bolt holes, each bolt hole extending through the block to facilitate fastening the blocks to the barrier.

20. An apparatus according to claim 1 wherein each of the plurality of support blocks comprises an outer rib extending from the back side of the block body and having a shape corresponding to a shape of the aperture to facilitate positioning of the plurality of support blocks with respect to the aperture.

* * * * *